United States Patent [19]

Hasegawa

[11] Patent Number: 4,457,651
[45] Date of Patent: Jul. 3, 1984

[54] NAIL

[75] Inventor: Takeo Hasegawa, Shiga, Japan

[73] Assignee: Wakai & Co., Ltd., Osaka, Japan

[21] Appl. No.: 314,093

[22] PCT Filed: Feb. 17, 1981

[86] PCT No.: PCT/JP81/00027
§ 371 Date: Oct. 13, 1981
§ 102(e) Date: Oct. 13, 1981

[87] PCT Pub. No.: WO81/02450
PCT Pub. Date: Sep. 3, 1981

[30] Foreign Application Priority Data

Feb. 22, 1981 [JP] Japan ................................. 55-22671

[51] Int. Cl.³ ...................... F16B 13/04; F16B 15/04
[52] U.S. Cl. ...................................... 411/29; 411/449; 411/495
[58] Field of Search .................. 411/15, 22, 28, 29, 411/75, 79, 80, 446, 447, 448, 449, 450, 457, 471, 472, 477, 478, 479, 495

[56] References Cited

U.S. PATENT DOCUMENTS

| | | | |
|---|---|---|---|
| 1,031,878 | 7/1912 | Sisk | 411/448 |
| 1,433,206 | 10/1922 | Hojnowski | 411/495 |
| 1,680,905 | 8/1928 | Mower | 411/448 X |
| 1,768,670 | 1/1930 | Dedering | 411/15 |
| 1,768,721 | 7/1930 | Taylor | 411/15 |
| 2,283,243 | 5/1942 | Vatet | 411/449 |
| 2,329,744 | 9/1943 | Clarke | 411/495 X |
| 3,878,756 | 4/1975 | Hallock | 411/446 |
| 4,179,975 | 12/1979 | Forcina | 411/448 |

FOREIGN PATENT DOCUMENTS

| | | | |
|---|---|---|---|
| 166703 | 1/1906 | Fed. Rep. of Germany | 411/448 |
| WO80/02185 | 10/1980 | PCT Int'l Appl. | 411/471 |
| 5098 | of 1898 | United Kingdom | 411/457 |
| 398401 | 9/1933 | United Kingdom | 411/447 |
| 855640 | 12/1960 | United Kingdom | 411/448 |

Primary Examiner—Thomas J. Holko
Attorney, Agent, or Firm—Jordan and Hamburg

[57] ABSTRACT

A pair of nail shank pieces are united face to face through the intermediary of a strip metal, and the tip parts of both nail shank pieces are tapered so that both nail shank pieces may be gradually opened as the nail is driven in. The metal strip is subjected to a compressive deformation to support the nail shank pieces from inside, thereby helping in their maintaining an opened state. Both nail shank pieces engage the base material in a dovetail fashion and in this way, the countering force against the nail's coming out is reinforced. A clamping ring fit around the outer circumference of both nail shank pieces to hold the metal strip therebetween such that both nail shank pieces are prevented from opening at the base material surface, and moreover, the opening made by the nail at the base material surface is protected from widening, while aiding in both nail shank pieces entering deep into the base material.

8 Claims, 6 Drawing Figures

FIG. 4
FIG. 5
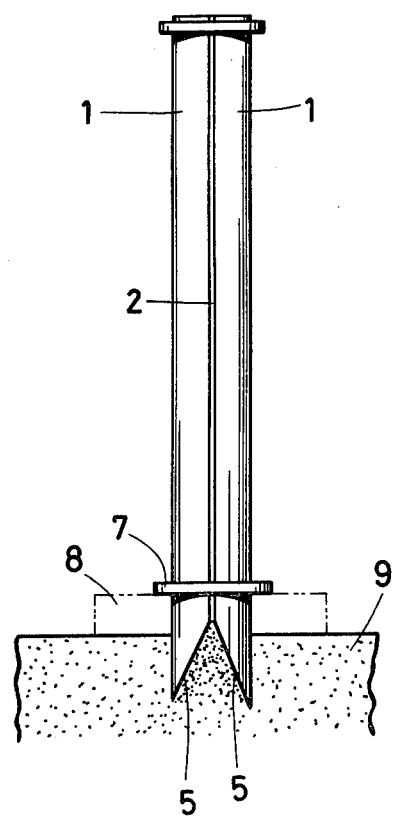
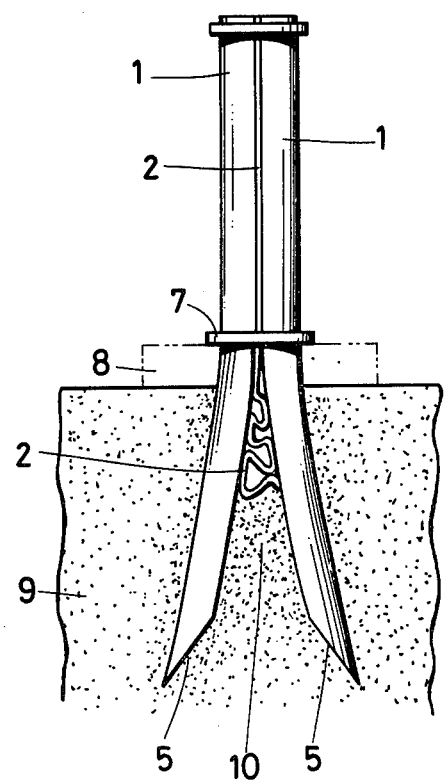

NAIL

FIELD OF THE INVENTION

The present invention relates to the structure of a nail to be driven into wall surfaces, etc. of a building which, after being driven in, exhibits very powerful countering force against its coming out, and which particularly, has large enough resistance or countering effect to its coming out in any base material like expanded concrete which is soft and porous.

DESCRIPTION OF THE PRIOR ART

Old nails were inadequate because they had a smooth circumferential surface around their shanks and such a nail often comes out of the base material into which it has been driven.

In order to prevent this coming out, a nail provided around the circumferential surface of the root of its shank with a means for countering its coming out including spiral grooves, ring-shape grooves or protruded stripes, etc. has been developed. The means for countering the coming out of this type provides adequate countering force against the coming out in such a base material as wood, but in soft, porous materials like expanded concrete, the countering effect against the coming out could hardly be expected because of the small friction between the nail and the base material.

DISCLOSURE OF THE INVENTION

The nail of this invention has a pair of nail shank pieces united face to face through an intermediary of a strip metal, with the facing surfaces of the tip parts of both nail shank pieces being tapered. When this nail is driven into a soft and porous base material as expanded concrete, not only do both nail shank pieces open to both sides, but the metal strip undergoes compressive deformation, thereby holding the opened state from the inside. Accordingly, both nail shank pieces engage the base material in a dovetail fashion, providing powerful countering force against the nail's coming out.

The nail of this invention has a clamping ring which is put around the outer circumference of both nail shank pieces holding the metal strip therebetween. This clamping ring, placed at the surface part of the base material, prevents both nail shank pieces from opening at the base material surface, and aids in both nail shank parts' entering deep into the base material as well as preventing the expansion of the opening made by the nail at the base material surface.

BRIEF DESCRIPTION OF THE DRAWINGS

FIG. 3 is a front view showing the configuration of the nail when completely driven in; and FIGS. 4 through 6 are explanatory views showing how the nail driving proceeds.

DESCRIPTION OF THE PREFERRED EMBODIMENTS

Figure 1:
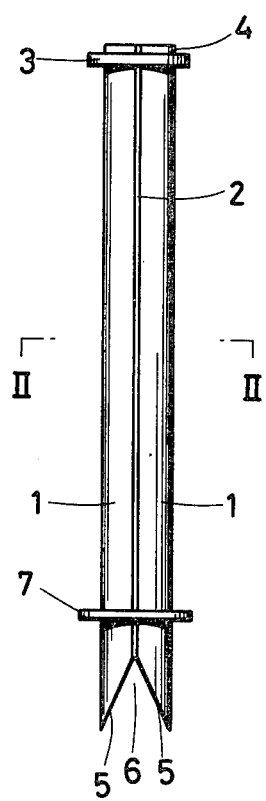
FIG. 1 is a front view of the nail of this invention.
Figure 3:
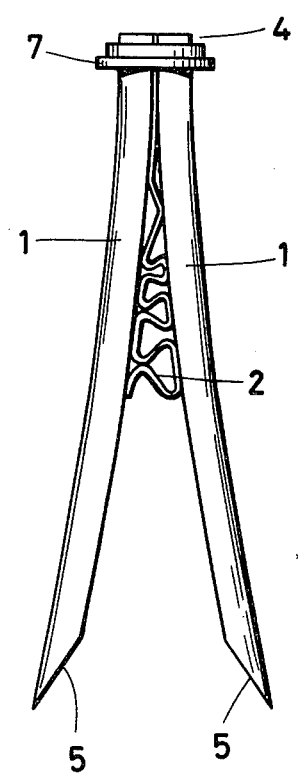
Figure 2:
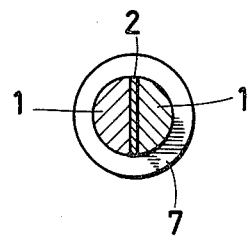
FIG. 2 is a sectional view of the nail taken along the line II—II of FIG. 1.

FIG. 1 through 3 represent the structure of the nail of this invention.

In the nail structure illustrated in the drawings, a pair of nail shank pieces (1) (1) each having a semi-circular shank piece section facing each other with their flat sides turned inwardly, a thin strip metal (2) is interposed entirely between both nail shank pieces (1) (1), and these three parts are closely held together. The metal strip (2) is formed of a metal such as copper, stainless steel, etc., with its width being identical to the width of the nail shank (1), but its length somewhat shorter than the latter's. On the root parts of both nail shank pieces (1) (1), a fixing ring (3) is fit and set to form a nail head part (4). At the tip part of both nail shank pieces (1) (1), respectively, symmetrical tapered surfaces (5) (5) are formed on their facing sides, so that the outer edge sides of the tips of the nail shank pieces (1) (1) are sharp, and an outwardly flaring opening (6) is formed between the facing tapered surfaces (5) (5).

In the nail structure of this invention, a washer-like clamping ring (7) is closely fit on the circumferential surfaces of the bottom parts of both nail shank pieces (1) (1) holding the metal strip (2) therebetween. This clamping ring (7) holds both nail shank pieces (1) (1) and the metal strip (2) in close contact with each other, and as the nail is driven in, the ring is pressed by the base material, in effect, to move up in the axial direction along the circumference of both nail shank pieces (1) (1).

Figure 6:
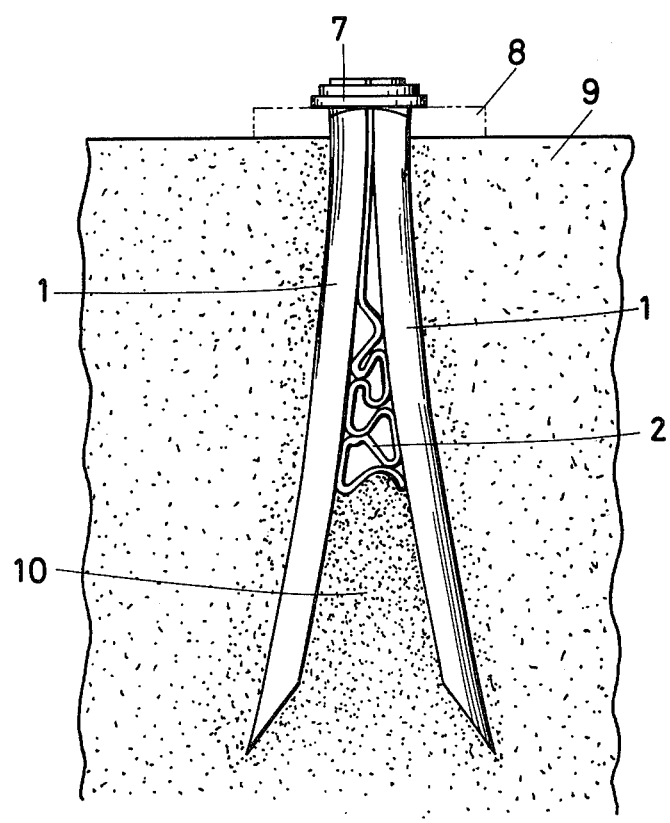

FIGS. 4 through 6 show how a structural member (8) is securely set in place on the surface of a soft and porous base material (9) such as expanded concrete.

At the initial stage of driving in the nail into the base material (9), both nail shank pieces (1) (1) will go straightly into the base material (9) in the state of being closed (FIG. 4) because the base material is soft.

As the tip of the nail enters into the base material (9) deeper and deeper, the material in the path of the nail is subjected to the thrusting and the pinching pressures by the tapered surfaces (5) (5) of its tip parts. The material will then be compressed and hardened, to be more compact, as compared with the surrounding material. Then on the tapered surfaces (5) (5) of the tip parts of both nail shank pieces (1) (1), the counter force from the hardened material (10) is exerted in the vertical direction, and this force separates the facing nail shank pieces (1) (1), pushing them outwardly from each other as the driving of the nail proceeds (FIG. 5).

As the tip parts of the nail shank pieces (1) (1) start opening, the counter force of the hardened material (10) acts upon the metal strip (2) placed between the nail shank pieces (1) (1). The metal strip (2) undergoes compressive deformation sinuously in response to the nail being driven in, filling the gap between both nail shank pieces (1) (1) in cooperation with the hardened material (10). Accordingly, the nail shank pieces (1) (1) are opened outwardly wider and wider, finally to engage the base material (9) in a dovetail fashion as the nail has been completely driven thereinto (FIG. 6).

The clamping ring (7) is pressed by the structural member (8) in response to the driving-in of the nail, in effect, to move up on the nail shank pieces (1) (1), so that it always stays at the surface part of the structural member (8). Thus this ring prevents the opening of both nail shank pieces (1) (1) at the surface part of the base material (9). Accordingly, it not only aids in both nail shank pieces' (1) (1) entering deep into the base material (9), but also serves to prevent the opening made by the nail at the surface of the base material (9) from growing larger.

The nail shank pieces (1) (1) thus driven into the base material (9) are held in their opened state under the powerful counter forces of the sinuously deformed metal strip (2) and the hardened material (10), and in proportion to these forces, the frictional resistance between the nail shank (1) and the base material increases. It is for this reason that the nail of this invention exhibits such a large counter force against its coming out that its drawing-out is impossible once it has been driven in.

The nail of this invention is not only formed of a material which undergoes a plastic deformation (permanent deformation) as it is completely driven into the base material (9), but the size and the sectional shape of the nail shank (1) are appropriately chosen so that its dovetail engagement with the base material (9) may be semipermanently maintained.

What is claimed is:

1. A nail adapted to be driven into a material comprising a pair of longitudinally extending shank elements, fixing means fixing together one longitudinal end portion of said shank elements, the other end of said shank elements having tapered end portions, a longitudinally extending strip disposed between said shank elements, and a clamping element disposed about the outside of said shank elements for holding together said shank elements with said strip disposed therebetween said nail consisting of said two shank elements with said strip therebetween having solid circular cross sectional configuration, each of said shank elements having a solid semi-circular configuration composed of a flat planar portion and a circular portion, said strip having a solid rectangular configuration with a pair of opposed flat planar walls which abut said flat planar portion of said shanks, said flat planar walls having a width corresponding substantially to the diameter of said nail, said strip being disposed entirely between said shank elements, said strip being constructed and arranged such that when said nail is driven into said material, said shank elements spread apart as said strip engages said material and is deformed in a lateral direction to exert a lateral force on said shank elements to spread apart said shank elements, said clamping element sliding longitudinally on said shank elements to permit said shank elements to spread apart as said nail is driven into said material.

2. A nail according to claim 1, wherein said strip is constructed and arranged to deform generally sinuously where said nail is driven into said material.

3. A nail according to claim 2, wherein said strip is constructed and arranged to reduce its overall longitudinal length when it is sinuously deformed.

4. A nail according to claim 1, wherein said nail has a circular cross sectional configuration, said clamping element comprising a ring having an inner diameter corresponding to the diameter of said circular cross sectional configuration.

5. A nail according to claim 1, wherein each of said tapered end portions comprise a planar surface disposed in an inverted V-shaped configuration with the apex of the V generally coinciding with a diametrical line of said nail.

6. A nail according to claim 5, wherein said planar surfaces extend to the longitudinal ends of the respective shank elements such that said planar surfaces together with the outer surfaces of said shanks define spaced pointed ends on said nail.

7. A nail according to claim 5, wherein said strip has a longitudinal length extending from said fixing means to the apex of said V.

8. A nail according to claim 1, wherein said strip is made of metal.

* * * * *